United States Patent [19]

Suzuki et al.

[11] Patent Number: 4,617,793

[45] Date of Patent: Oct. 21, 1986

[54] EXHAUST-GAS PARTICLE TREATING DEVICE FOR INTERNAL COMBUSTION ENGINE

[75] Inventors: Shoichi Suzuki; Keiichi Yamada, both of Higashi-Matsuyama, Japan

[73] Assignee: Diesel Kiki Co., Ltd., Tokyo, Japan

[21] Appl. No.: 578,759

[22] Filed: Feb. 9, 1984

[30] Foreign Application Priority Data

Feb. 23, 1983 [JP] Japan .............................. 58-25585[U]

[51] Int. Cl.[4] ................................................ F01N 3/02
[52] U.S. Cl. .......................................... 60/285; 60/311
[58] Field of Search ................... 60/274, 285, 286, 311

[56] References Cited

U.S. PATENT DOCUMENTS 4,452,040 6/1984 Kobashi ............................ 60/286

FOREIGN PATENT DOCUMENTS 70619 1/1983 European Pat. Off. ............. 60/311

*Primary Examiner*—Douglas Hart
*Attorney, Agent, or Firm*—Wenderoth, Lind & Ponack

[57] ABSTRACT

In the regeneration of a filter which filters and collects exhaust-gas particles contained in exhaust gases of an internal combustion engine by combustion, two injection pipes for pressure feeding a fuel to a fuel injection nozzle from a fuel injection pump for a plurality of cylinders are selected, and a proper amount of a pressurized fuel passing through one injection pipe is jetted to a cylinder in the end of an expansion stroke or in an exhaust stroke through another injection pipe, by controlling a changeover valve, and it is discharged to the exhaust of the engine in the unburnt or burnt condition. A valve capable of varying the flowrate is used as the changeover valve.

4 Claims, 6 Drawing Figures

DISPLACEMENT of THE SPOOL VALVE

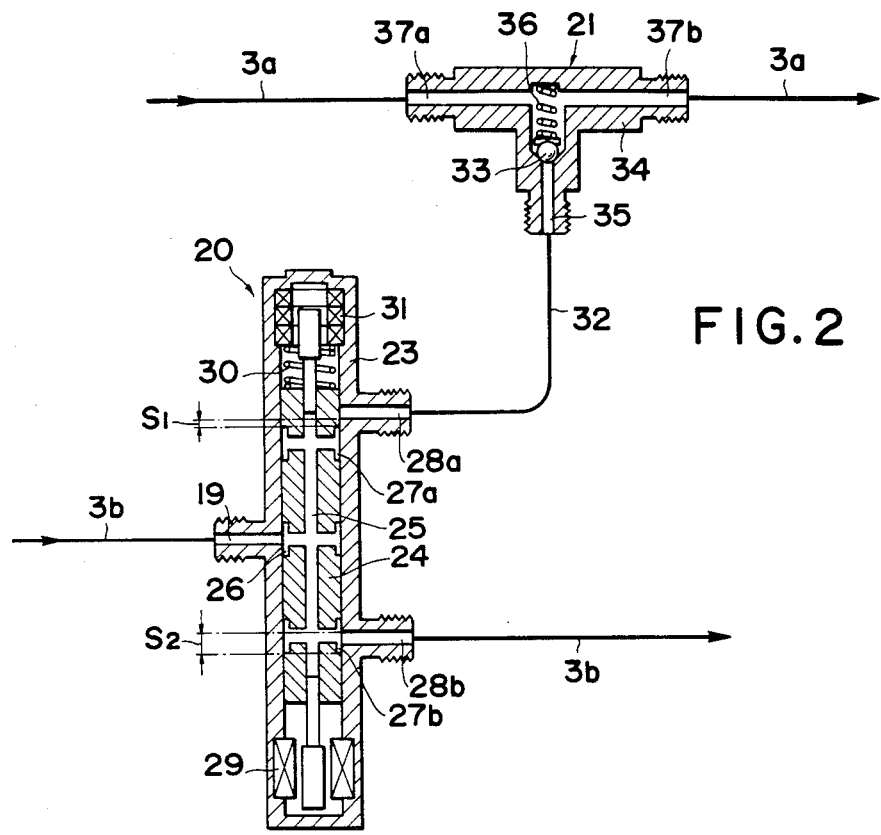
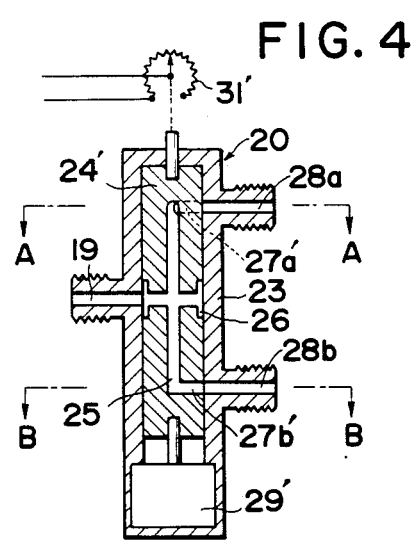
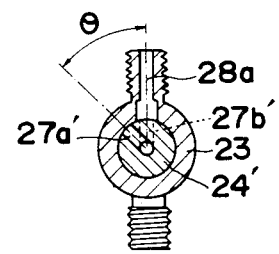
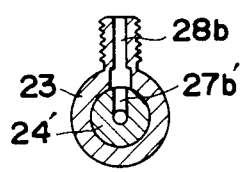

EXHAUST-GAS PARTICLE TREATING DEVICE FOR INTERNAL COMBUSTION ENGINE

FIELD OF THE INVENTION

This invention relates to exhaust-gas particle treating device for performing a regeneration of a filter which filters and collects exhaust-gas particle contained in exhaust gases of the internal combustion engine, by combustion.

BACKGROUND OF THE INVENTION

In diesel engines, a filter is provided for preventing the discharge of a large amount of exhaust-gas particles into the atmosphere since the particles are exhausted from the engines, and such a filter is provided to collect the particles. However, since the ventilating resistance of the filter is increased as the accumulation of particles on the surface increases, a means is employed to regenerate the filter by heating the collected particles and burning and eliminating them.

As a heating means for regeneration of the filter, as reported and disclosed in the Japanese Laid-open Utility Model Publication No. 57-136814, a proposal to provide an oil burner was made. A pressure pump was required to be newly installed which was separate from the engine system which resulted in a larger size of the device and high cost and mounting of pipings or the like which was troublesome.

SUMMARY OF THE INVENTION

This invention is to eliminate the foregoing drawbacks, and its comstruction provides a plurality of injection pipes for pressure feeding a fuel to a fuel injection nozzle from a fuel injection pump for a plurality of cylinders, and a proper amount of the pressurized fuel for obtaining the filter regeneration energy passing through one injection pipe of two selected injection pipes is jetted to a cylinder at an end part of an expansion stroke or an exhaust stroke by controlling a changeover valve through the other selected injection pipe, whereby the fuel is supplied to the filter in the unburnt or burnt condition. Accordingly, it eliminates the necessity of providing a separate pump for pressurization, and also, eliminates the necessity for installation of pipings.

An object of this invention is to supply a fuel to a filter for collection of exhaust-gas particles without using a separate pressure pump.

Another object of this invention is to supply a proper amount of a fuel to a filter depending on conditions so that the amount of the fuel to be supplied can be varied.

BRIEF DESCRIPTION OF THE DRAWINGS

FIG. 2 is an enlarged cross section of an essential portion of this invention;

FIG. 4 is an enlarged cross section of an essential part according to another embodiment of this invention;

FIG. 5 is a cross section taken along a line A—A of FIG. 4; and

FIG. 6 is a cross section taken along a line B—B of FIG. 4.

DETAILED DESCRIPTION OF THE INVENTION

Figure 1:
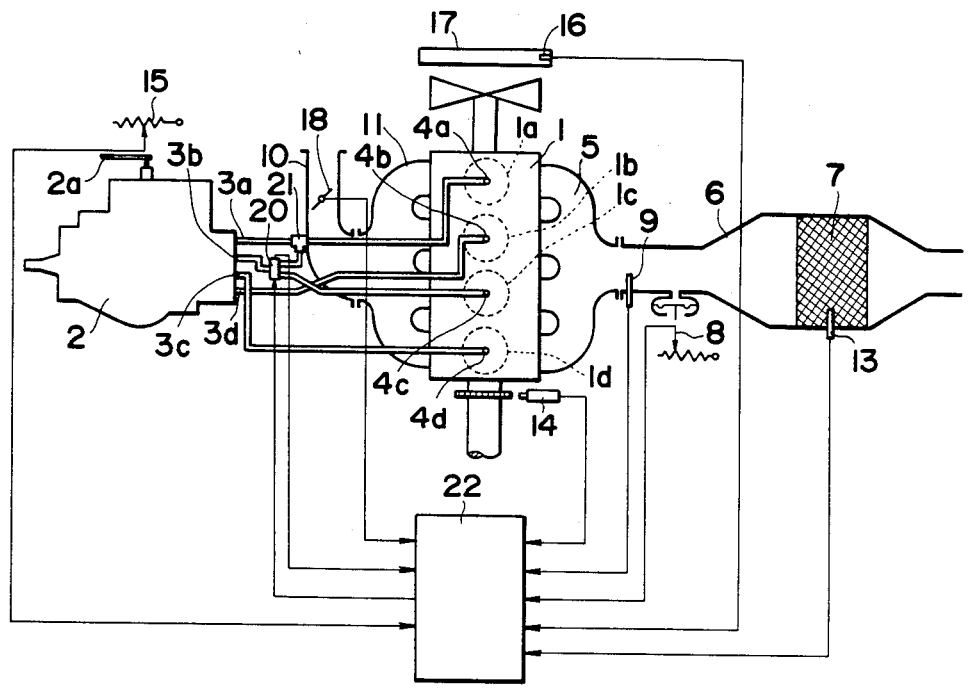
FIG. 1 is a schematic view of an embodiment of this invention.

An embodiment of this invention will be described in the following by referring to the drawings.

In FIGS. 1 and 2, schematic views of this invention are shown, and reference numeral 1 denotes a diesel engine proper for a vehicle, and the air is introduced through an air cleaner (not shown), suction pipe 10, and suction manifold 11, and a fuel injection pump 2 is provided, which can be, for example, an in-line pump, distribution fuel injection pump, but in this embodiment is a distribution fuel injection pump of the Bosch four-cylinder type which distributes and jets the fuel by the rotation and reciprocation of a plunger so that the fuel is jetted by means of injection pipes 3a, 3b, 3c and 3d. The injected fuel is ignited in each cylinder 1a, 1b, 1c and 1d from each injection nozzle 4a, 4b, 4c and 4d, is burnt, and the combustion energy drives the engine to produce the mechanical energy, and the combustion gas is discharged through an exhaust pipe 6 from the exhaust manifold 5.

In the exhaust pipe 6, a filter 7 for collecting the exhaust-gas particles in the exhaust gas is provided, and if necessary, a catalyst for lowering the ignition temperature is used.

There are also provided, in the exhaust pipe 6, an exhaust pressure detector 8 for detecting exhaust pressure in the exhaust pipe, an exhaust temperature detector 9 for detecting exhaust temperature in the exhaust pipe, and a filter temperature detector 13 in the filter 7, and electrical signals (resistance value changes) from these detectors 8, 9, 13 are inputted to a control circuit 22 to be described hereinafter.

A r.p.m. detector 14 uses the r.p.m. of the engine as a pulse, and a load detector 15 detects the rotation angle of a speed lever 2a of the distribution fuel injection pump 2, and a radiator hot water detector 16 detects the temperature of a radiator 17, and a suction throttle valve 18 detects the throttle amount respectively, and these detection signals are inputted to a control circuit 22 to be described hereinafter.

Of the injection pipes 3a, 3b, 3c and 3d for feeding the pressure fuel for injection to injection nozzles 4a, 4b, 4c and 4d, the injection pipe 3b is provided with a changeover valve 20.

Figure 3:
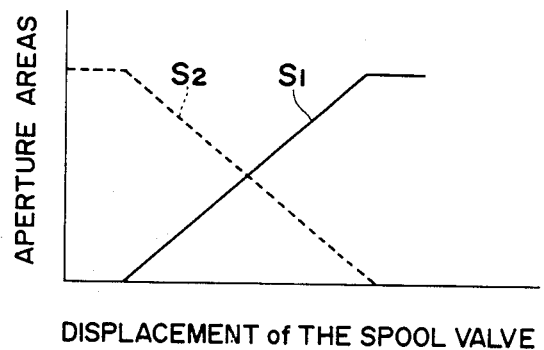
FIG. 3 is a characteristic diagram for the flow of fuel in the device of FIG. 2.

In the changeover valve 20, a spool valve 24 is disposed slidably in the body 23, and the spool valve 24 is displaced against a return spring 30 by the value of electric current flowing in an electromagnetic coil 29 so that its amount of displacement is detected by a differential transformer 31, and is fed back to the control circuit 22. In the spool valve 24, distribution grooves 27a and 27b for control are disposed at a proper interval which sandwiches a lead hole 26 formed in the center in communication with an axial hole 25, and the lead hole 26 is connected to a connection hole 19 connected to the injection pipe 3b at the side toward the fuel injection pump. The aperture areas of distribution grooves 27a and 27b are changed by the displacement of the spool valve 24 by means of connection holes 28a and 28b, and the aperture area $S_1$ consisting of the distribution groove 27a and the connection hole 28a and the aperture area $S_2$ consisting of the distribution groove 27b and the connection hole 28b are in a mutually inverse proportion as shown in FIG. 3.

The connection hole 28a is connected to a connection hle 35 of a check valve body 34 of the check valve 21 by means of a communication conduit 32, so that only flow in the direction toward the injection pipe 3a from the conduit 32 is allowed. Reference numeral 36 denotes a spring for applying the pressure to the valve member 33 and numerals 37a and 37b denote connection holes.

Also, the connection hole 28b is connected to the injection pipe 2b connected to the injection nozzle 4c.

The control circuit 22 is to control the changeover valve 20, and the ventilation resistance of the filter 7 is increased as the particles accumulate on the exhaust in the filter 7, and when a desired value is reached, namely, the amount of the collected exhaust-gas particles reaches a predetermined amount, it is detected by the exhaust pressure detector 8 for detecting the exhaust pressure in the exhaust pipe and a control signal is outputted to the changeover valve 20. This control signal is continued until the predetermined exhaust pressure is resumed.

The control circuit 22 is adapted to receive the exhaust temperature of the exhaust pipe, temperature in the filter 7, temperature in the radiator 17, r.p.m. of the engine, throttle amount from the suction throttle valve 18 and other required signals, and the control signal to be outputted to the changeover valve 20, namely, the amount of the fuel for burning the exhaust-gas particles collected by the filter is properly controlled, and at the idling time or before the warm-up of the engine, the control for cutting off the control may be carried out.

In the foregoing construction, the rotation and the reciprocation of the plunger are carried out by the drive of the engine, and as the result, the fuel is sucked and compressed and is sequentially pressure fed to the injection nozzles 4a, 4b, 4c and 4d by means of the injection pipes 3a, 3b, 3c and 3d, and in this Embodiment, when the ignition order is assumed to be 1, 3, 4, 2, the fuel is jetted into the cylinders 1a, 1c, 1d and 1b after it is jetted from the injection nozzles 4a, 4c, 4d and 4b. The exhaust-gas particles exhausted from the engine by the operation of the engine are collected on the filter 7, and the amount of the exhaust-gas particles is increased gradually, and the filter 7 gets clogged whereby the trouble occurs to the nornal flow of the exhaust gas. As a result, the exhaust pressure in the exhaust pipe 6 becomes higher, and the collection of a predetermined amount of the exhaust-gas particles in the filter is detected by means of the exhaust pressure and when the conditions such as the r.p.m. (excluding the idling) are satisfied, the drive signal is outputted from the control circuit 22 to the changeover valve 20, and the electromagnetic coil 29 is excited, and the spool valve 24 is displaced against the return spring 30 from the condition shown in FIG. 2. For this reason, the aperture area $S_2$ of injection pipe 3b is decreased, and part of the fuel flows through the distribution groove 27a, and connection hole 28a, and communication pipe 32 and lifts the check valve 33 to flow to the injection pipe 3a, and is jetted from the injection nozzle 4a into the cylinder 1a that is at the end of the expansion stroke or the exhaust stroke. The jetted fuel is discharged together with the combustion gas at the exhaust stroke time. At this time, the fuel is discharged into the exhaust pipe 6 in the unburnt or burnt condition, and the unburnt fuel is burnt by the heat in the manifold 5, exhaust pipe 6 or an igniting device provided if necessary and reaches the filter 7, and the exhaust-gas particles collected on the filter 7 are burnt. The control of the amount of the fuel to be provided for burning the exhaust-gas particles collected on the filter 7 can be varied by the aperture areas $S_1$ and $S_2$ by the control of the value of electric current applied to the coil 29 in various conditions.

In FIGS. 4 through 6, another embodiment of this invention is illustrated, and this embodiment is different from the foregoing embodiment, in that in lieu of the spool value 24, a rotary valve 24' disposed in the body of the changeover valve 20 and is rotated, and distribution holes 27a' and 27b' formed in the rotary valve 24' supply the fuel for combustion of the exhaust-gas particles in cooperation with the connection holes 28a and 28b.

Namely, the rotary valve 24' is formed with the lead hole 26 in communication with the connection hole 19 connected to the injection pipe 3b at the side toward the fuel injection pump, and this lead hole 26 is communicated with the axial hole 25. At both ends of the axial hole 25, distribution holes 27a' and 27b' are formed at a proper angle θ to each other. Accordingly, when the rotary valve 24' is rotated by a motor 29', the relationship of the distribution holes 27a' and 27b' and the connection holes 28a and 28b has a characteristic similar to the characteristic shown in FIG. 3. Therefore, the fuel for combustion of the exhaust-gas particles can be properly changed according to various conditions, and the fuel for the most optimum combustion of the exhaust-gas particles can be supplied.

In this embodiment, the amount of rotation of the rotary valve 24' is detected by a potentiometer 31', and is fed back to the control circuit.

What is claimed is:

1. An exhaust gas particle treating device for an internal combustion engine having fuel injection nozzles and fuel supply pipes connected thereto, and an exhaust gas system having a filter for collection of exhaust gas particles therein, which filter is to be regenerated by burning the exhaust gas particles collected on the filter, said device comprising:

a changeover valve which connects at least two of the fuel supply pipes and having means for adjusting the flowrate of fuel from one of said injection pipes to the other;

means for detecting engine conditions indicating the necessity for regenerating the filter;

a control circuit means connected to said engine condition detecting means and to said changeover valve for moving said changeover valve in response to detection of engine conditions indicating the necessity for regenerating the filter; and means for detecting the amount of displacement of said changeover valve connected to said control circuit means for causing said control circuit means to stop moving said changeover valve when a position thereof is reached for causing the desired amount of flow through said changeover valve.

2. An exhaust gas particle treating device as claimed in claim 1 in which said changeover valve is a spool valve.

3. An exhaust gas particle treating device as claimed in claim 1 in which said changeover valve is a rotary valve.

4. An exhaust gas particle treating device as claimed in claim 1 in which said changeover valve comprises a valve for providing a flowrate therethrough for making the flowrates of the fuel in the two fuel supply pipes mutually inversely proportional.

* * * * *